United States Patent
Tsukahara et al.

(10) Patent No.: US 10,650,037 B2
(45) Date of Patent: May 12, 2020

(54) ENHANCING INFORMATION IN A THREE-DIMENSIONAL MAP

(71) Applicant: Sony Corporation, Tokyo (JP)

(72) Inventors: Tsubasa Tsukahara, Tokyo (JP); Allison Marlene Chaney, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 45 days.

(21) Appl. No.: 15/595,405

(22) Filed: May 15, 2017

(65) Prior Publication Data
US 2018/0329908 A1    Nov. 15, 2018

(51) Int. Cl.
| | |
|---|---|
| G06F 3/00 | (2006.01) |
| G06F 16/435 | (2019.01) |
| G06F 16/487 | (2019.01) |
| G06F 3/01 | (2006.01) |
| G06T 19/00 | (2011.01) |
| G06F 1/16 | (2006.01) |

(52) U.S. Cl.
CPC ............ *G06F 16/437* (2019.01); *G06F 1/163* (2013.01); *G06F 3/011* (2013.01); *G06F 16/487* (2019.01); *G06T 19/00* (2013.01)

(58) Field of Classification Search
CPC ........ G06F 16/437; G06F 1/163; G06F 3/011; G06T 19/00
See application file for complete search history.

(56) References Cited

U.S. PATENT DOCUMENTS

| | | | |
|---|---|---|---|
| 9,141,188 B2 | 9/2015 | Fein | |
| 9,304,003 B1* | 4/2016 | Ashman | G01C 21/206 |
| 2012/0194420 A1 | 8/2012 | Osterhout | |
| 2012/0249544 A1 | 10/2012 | Maciocci et al. | |
| 2013/0293530 A1* | 11/2013 | Perez | G06K 9/00671 |
| | | | 345/418 |
| 2014/0098127 A1* | 4/2014 | Fein | G06F 3/011 |
| | | | 345/633 |
| 2015/0002507 A1* | 1/2015 | Ambrus | G02B 27/017 |
| | | | 345/419 |
| 2015/0356783 A1 | 12/2015 | Miller et al. | |
| 2018/0129276 A1* | 5/2018 | Nguyen | G09B 19/00 |

* cited by examiner

*Primary Examiner* — Thanh T Vu
(74) *Attorney, Agent, or Firm* — Trellis IP Law Group, PC

(57) ABSTRACT

Implementations generally relate to enhancing information in a three-dimensional map (3D). In some implementations, a method includes determining, using a client device, user information associated with a user. The method further includes generating a 3D map of a physical environment based on the user information. The method further includes determining relevant information based on the user information. The method further includes displaying the relevant information in the 3D map in a user interface of the client device.

17 Claims, 8 Drawing Sheets

ENHANCING INFORMATION IN A THREE-DIMENSIONAL MAP

BACKGROUND

Three-dimensional (3D) maps provide a user with a representation of a physical environment. 3D maps represent internal environments (e.g., indoors) or external environments (e.g., outdoors). 3D maps may be generated using specialized optical display devices. In some cases, such devices are mounted on or around the user's head. In other cases, such devices may be hand-held devices such as smartphones. 3D maps have various applications. For example, a 3D map may be used in video game systems, augmented reality systems, etc.

SUMMARY

Implementations generally relate to enhancing information in a three-dimensional (3D) map. In some implementations, a method includes determining, using a client device, user information associated with a user. The method further includes generating a 3D map of a physical environment based on the user information. The method further includes determining relevant information based on the user information. The method further includes displaying the relevant information in the 3D map in a user interface of the client device.

A further understanding of the nature and the advantages of particular implementations disclosed herein may be realized by reference of the remaining portions of the specification and the attached drawings.

DETAILED DESCRIPTION

Implementations described herein build a 3D map using an augmented reality (AR) user device such as AR glasses. As described in more detail herein, implementations provide an AR user device that has a camera or device that measures 3D depth in the real world, physical environment.

In some implementations, a system determines user information associated with a user, using a client device such as an AR user device. The system further generates a 3D map of a physical environment based on the user information. The system further determines relevant information based on the user information. The system further displays the relevant information in the 3D map in a user interface of the client device.

Figure 1:
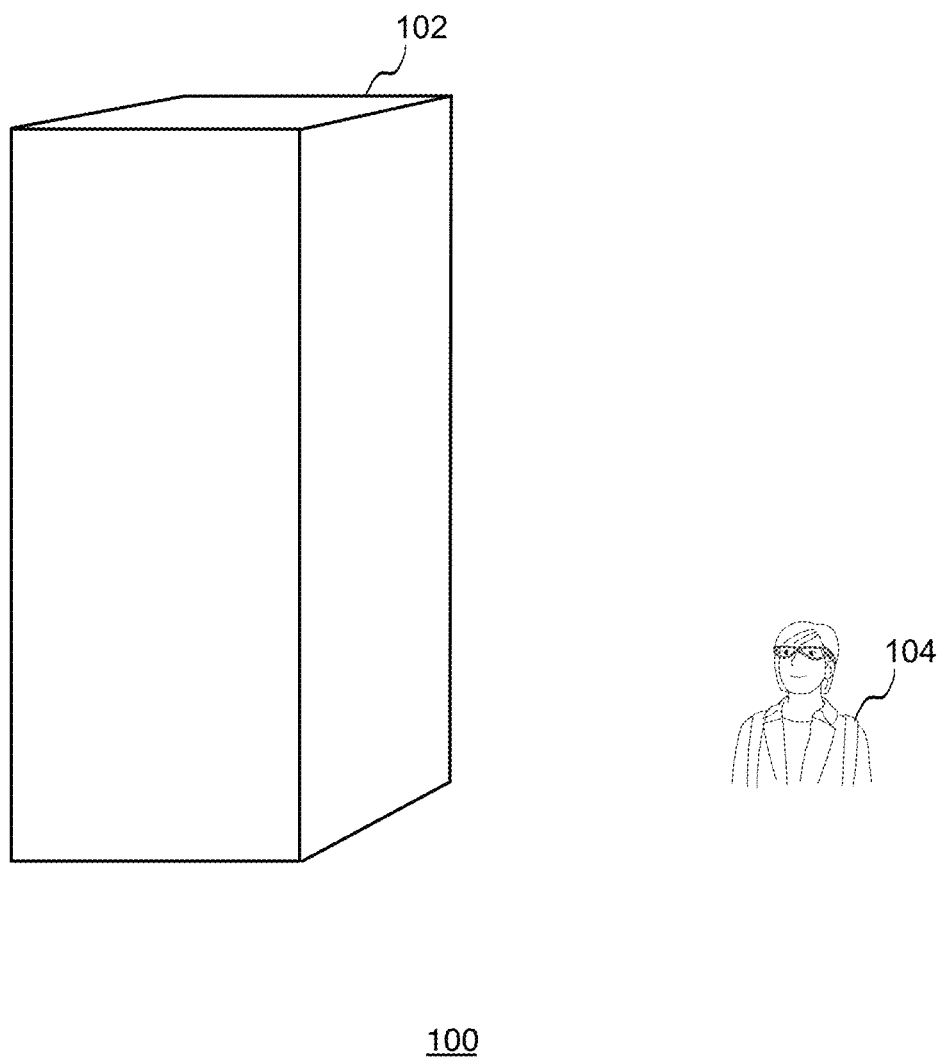
FIG. 1 illustrates a block diagram of an example physical environment, which may be used for some implementations described herein.

FIG. 1 illustrates a block diagram of an example physical environment 100, which may be used for some implementations described herein. Shown are a building 102 and a user 104. In this particular example scenario, user 104 is looking up at building 102. Various example implementations involving user 104 in physical environment 100 are described in more detail herein.

For ease of illustration, FIG. 1 shows a simplified example of physical environment 100, with a simplified block representing building 102. This block may represent any number of buildings and/or objects in physical environment 100. In other implementations, physical environment 100 may have other objects including other types of objects instead of, or in addition to, those shown herein.

Figure 2:
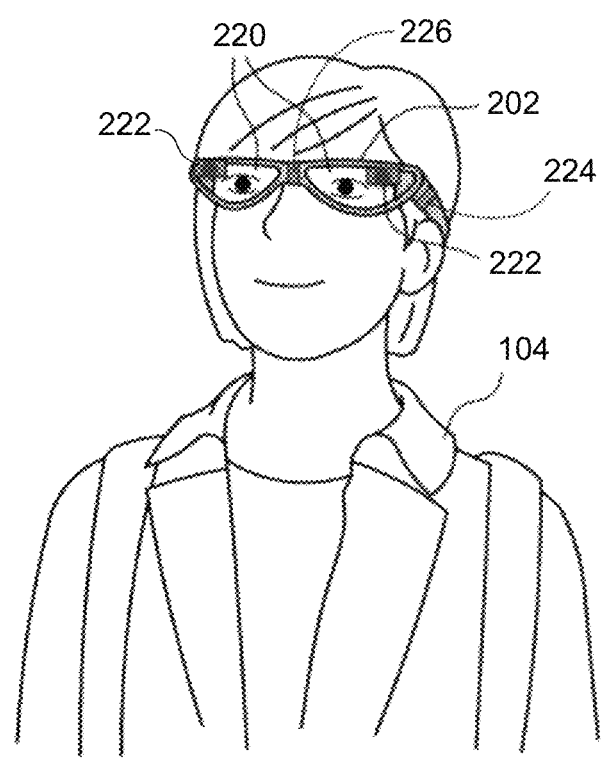
FIG. 2 illustrates a diagram of an example user device being worn by a user, according to some implementations.

FIG. 2 illustrates a diagram of an example user device 202 being worn by a user 104, which may be used for some implementations described herein. In various implementations, user device 202 includes display screens 220 and cameras 222. In some implementations, display screens 220 may use organic light-emitting diode (OLED) technology, including waveguide optics and/or bulk optical elements to focus and guide light from organic LEDs. In other implementations, other types of light sources and optics may be used. In various implementations, display screens 220 enable user 104 to view the actual, physical environment, and also enable the user to view virtual images superimposed on the viewed physical environment.

In various implementations, user device 202 may also include various sensors that facilitate in determining movements and activities of user 104. Various implementations directed at determining movements and activities of user 104 are described in more detail herein. In some implementations, user device 202 may include a head position sensor 224 and a head orientation sensor 226, which are shown integrated into user device 202. In some implementations, one or both of head position sensor 224 and head orientation sensor 226 may be separately mounted on other user devices worn by user 104. In other implementations, user device 202 may not have all of the components shown and/or may have other components including other types of components instead of, or in addition to, those shown herein. In other example implementations, user device 202 may include a 3D depth camera, an eye tracking device, etc. In some implementations, user device 202 may communicate with auxiliary devices such as pedometers, activity trackers, etc.

In various implementations, user device 202 is a part of an AR system, which displays one or more virtual images in display screens 220 viewable by user 104. In various implementations, the AR system may achieve this by controlling pixels of display screens 220, through which user 104 observes the external environment. As described in more detail herein, user device 202 enables user 104 to view the actual physical environment while simultaneously viewing virtual images that are superimposed on the view of the physical environment.

In some implementations, user device 202 may receive voice commands and requests from user 104. In some implementations, user device 202 may receive commands and requests in the form of hand gestures from user 104. In some implementations, user device 202 may act on behalf of user 104 without user input. For example, user device 202 may automatically provide information to user 104 (e.g., alerts, recommendations, etc.).

In various implementations, user device 202 is a wearable device. As shown, for example, user device 202 may be worn on the head of user 104 (e.g., as glasses). While some implementations are described herein in the context of user device 202, which is a head mounted device, these implementations and others may also apply to a variety of different types of user devices (e.g., headset, watch, smart phone, other electronics, etc.). Various user devices are possible, and the particular type of user device will depend on the particular implementation.

Figure 3:
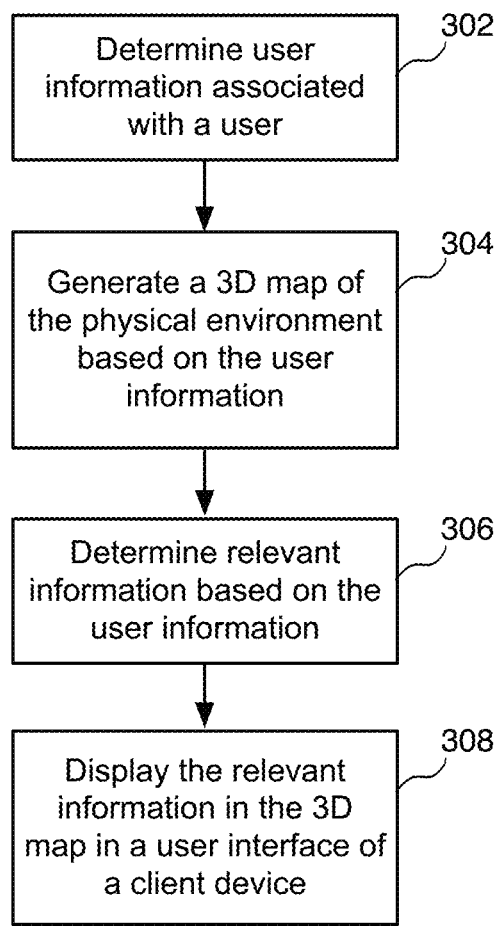
FIG. 3 illustrates an example flow diagram for enhancing information in a 3D map, according to some implementations.

FIG. 3 illustrates an example flow diagram for enhancing information in a 3D map, according to some implementations. Referring to both FIGS. 1, 2, and 3, a method is initiated at block 302, where the system such as a client device (e.g., user device 202 of FIG. 2) determines user information associated with a user. In various implementations, the user information includes information unique to user 104. As described in more detail herein, the system provides relevant information to the user based on the user information.

In some implementations, the user information may include 3D depth data, where the 3D depth data is collected by the client device (e.g., user device 202 of FIG. 2). In various implementations, the 3D depth data is based on the position of user 104 in the physical environment and from the point of view of user 104. For example, referring to FIGS. 1, 2, and 3, a user camera may include a 3D depth camera that determines the depth of objects in front of user 104, and more specifically, in the field of view of the depth camera of user device 202. Any suitable depth camera may be used.

In some implementations, the user information may also include user attention information. In some implementations, the system determines the user attention information based on user gaze information. For example, in some implementations, user device 202 of FIG. 2 may include an eye tracking device that determines eye positions and/or eye movement based on measurements of point of gaze of the user (e.g., line of sight). Any suitable eye tracking device and/or head orientation tracking device may be used.

In some implementations, the user information may also include user activity information. In some implementations, the activity information may include categories of activity. For example, categories may include stationary activities (e.g., being home, being at work, etc.). Categories may also include movement activities (e.g., walking, running, biking, driving, etc.).

In some implementations, the activity information may also include predetermined activities (e.g., walking, running, biking, driving, etc.). Any given predetermined activity may fall into a particular category of activity.

In some implementations, the user information may also include location information or geographical information. In some implementations, user device 202 may collect sensor information to determine the location and activity of user 104. Such sensor information may include data from a global positioning system (GPS), accelerometer, compass, etc.

In some implementations, the system may include user input. For example, in some implementations, the system may utilize any suitable hand gesture recognition techniques to recognize hand gestures. The particular hand gestures may vary and will depend on the particular implementation. For example, in some implementations, the user making a particular gesture with respect to a particular AR object or icon may have a predetermined meaning. For example, the user touching a particular AR object or icon may mean, "select." In another example, the user flicking AR icon may mean, "cancel." Using such hand gestures and/or other gestures may add more information to the 3D map via AR. For example, if a large (predetermined) number of users touch the same AR icon in the same area or position in the 3D map, the system may determine that such AR information is meaningful or relevant. In this case, the system may automatically display such relevant AR information and/or send such meaningful data to another device or service (e.g., smartphone, self-driving car, 2D map, etc.).

At block 304, the system generates a 3D map of the physical environment based on the user information. In some implementations, a 3D map may be based at least in part on the 3D depth data of the user information. In some implementations, the 3D map may include environmental elements that user device 202 detects (e.g., buildings, streets, sidewalks, alleys, etc.). As such, the system generates the 3D map as user 104 moves (e.g., walks, etc.) around a physical environment (e.g., around a city, etc.). As described in more detail herein, the system provides relevant information to user 104 based on the location of user 104 and where the attention of user 104 is place in the physical environment.

In some implementations, the AR system may receive user information associated with multiple users, where multiple user devices of different users upload user information to the AR system. The AR system may aggregate and synthesize user information from multiple users in order to include more data for the generating of the 3D map.

In some implementations, the system may also use two-dimensional (2D) map data to facilitate in generating the 3D map. For example, the system may generate a 2D map based on user movement detected by GPS. The system may access 2D mapping information from a supplemental source (e.g., a mapping service).

At block 306, the system determines relevant information based on the user information. In some implementations, the determining of the relevant information may be based on one or more relevance policies. In various implementations, the system analyzes the user information provided by user device 202, and may also include and analyze other data collected by various sensing devices. As indicated herein, user information may include attention information (e.g., based on direction of head, gaze, etc.). User information may also include user activity information such as whether the user is walking, running, biking, in a car, riding a bus, etc. User information may also include location information or geographical information (e.g., based on GPS position of the user, etc.). User information may also include user-provided commands based on voice, hand gestures, etc.

In some implementations, a relevance policy may include determining that information is relevant based on time of day and location of user 104. For example, if the time is 11:45 am (e.g., around lunch time) and the location of user 104 being in proximity to a building with restaurants, the system may determine a particular advertisement is relevant. As such, in some implementations, the relevant information may include advertisements. Because such advertisements are relevant to the user information (e.g., activity of the user), the advertisements are more likely to be useful to or desired by user 104.

In another example implementations, a relevance policy may include determining that information is relevant based on the current activity of user 104 and the movement of surrounding objects. For example, if user is walking toward a blind intersection and a fast moving object such as a car is approaching the intersection, the system may determine that an alert or warning to the user is relevant. Such an alert may include navigation information (e.g., stop walking or change direction in order to avoid danger). As such, in some implementations, the relevant information may include notifications. The relevant information may also include navigation information.

As described in more detail herein, in various implementations, the system aggregates such data in order to determine where the user's attention is in real, physical world and to provide user 104 with relevant information that may be useful to user 104.

At block 308, the system displays the relevant information in the 3D map in a user interface of the client device. In various implementations, the system uses map information (e.g., 2D and/or 3D map data) and user information in order to determine what information to display to user 104. As indicated herein, user device 202 enables user 104 to view the actual physical environment while simultaneously viewing virtual images that are superimposed on the view of the physical environment. The virtual image may include objects and/or text that convey information to user 104. For example, a virtual image that is a virtual object may include a logo or other image in an advertisement or an alert or warning. In some implementations, the virtual image may include text such as text in an advertisement or in an alert or warning.

In various implementations, the system, more specifically user device 202, presents information in order to inform the user of options. As described in more detail herein, such options may include purchasing behavior based on advertisements. For example, if shortly after an advertisement is displayed user 104 goes to store or restaurant associated with the advertisement, the system may determine that user 104 read the advertisement and acted accordingly.

Figure 4:
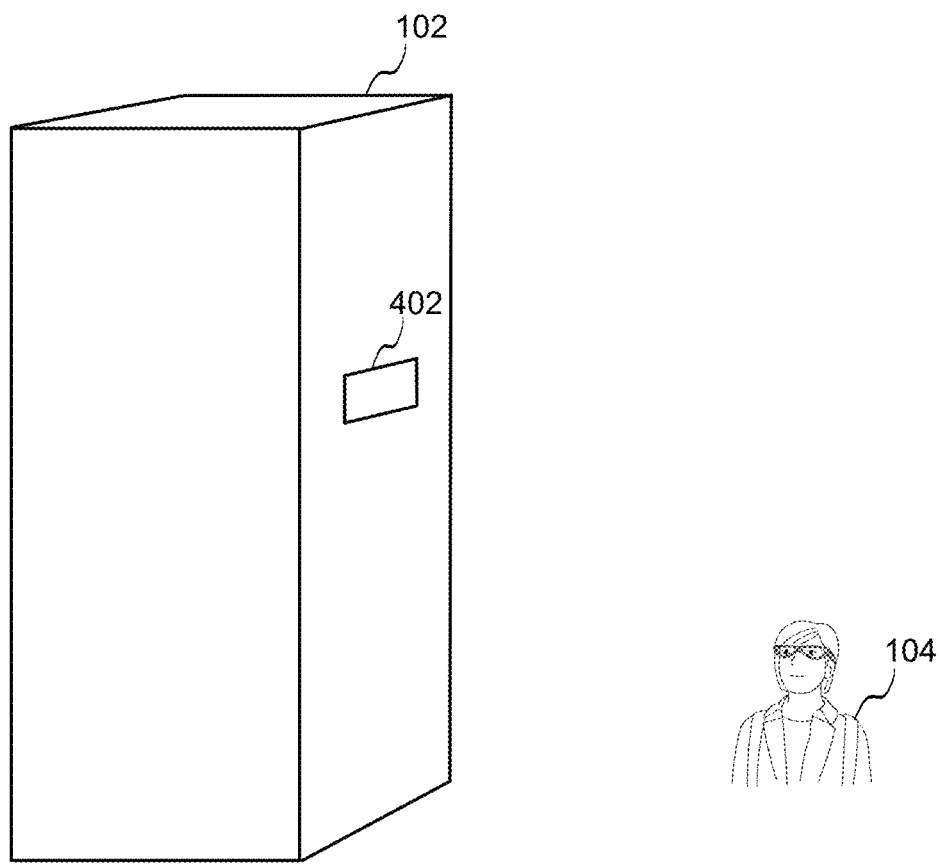
FIG. 4 illustrates a block diagram of an example augmented reality environment, according to some implementations.

FIG. 4 illustrates a block diagram of an example augmented reality environment, according to some implementations. Shown is building 102 and user 104. In this particular example scenario, user 104 is looking up at building 102, similarly to the scenario described in connection with FIG. 1.

As shown, an advertisement 402 is displayed against building 102. In various implementations, user 104 views the physical environment through display screens 220 of user device 202. User 104 also views advertisement 402 virtually on building 102 as if advertisement 402 is actually on building 102 in real life.

In some implementations, the system may determine a direction that user 104 may be looking based on the head orientation of user 104, and may determine optimal locations for placement of advertisement 402 in the environment based on the direction that user 104 is looking. In some implementations, the system may determine that areas in the scene are crowded, and may place ads in areas that are not crowded.

In various implementations, the placement of a virtual image such as advertisement 402 on display screens 220 is based on the attention of user 104. For example, user device 202 may display advertisement 402 at the area where user 104 is currently gazing or where user 104 is often gazing within a predetermined time period (e.g., 15 seconds, etc.). This increases the chances that user 104 will look at advertisement 402. In some implementations, user device 202 may move advertisement 402 to multiple locations, or show advertisement 402 in multiple locations, in order to bring advertisement 402 to the attention of user 104.

In some implementations, user device 202 may determine whether user 104 reads advertisement 402 or not. Such a determination may be based on user gaze or user behavior (e.g., entry into the advertised store or restaurant, etc.). In some implementations, user device 202 or the AR system may send such information to a source of the advertisement (e.g., the advertising client).

For ease of illustration, FIG. 1 shows a simplified example of physical environment 100, with a simplified block representing building 102. This block may represent any number of buildings and/or objects in physical environment 100. In other implementations, physical environment 100 may have other objects including other types of objects instead of, or in addition to, those shown herein.

Figure 5:
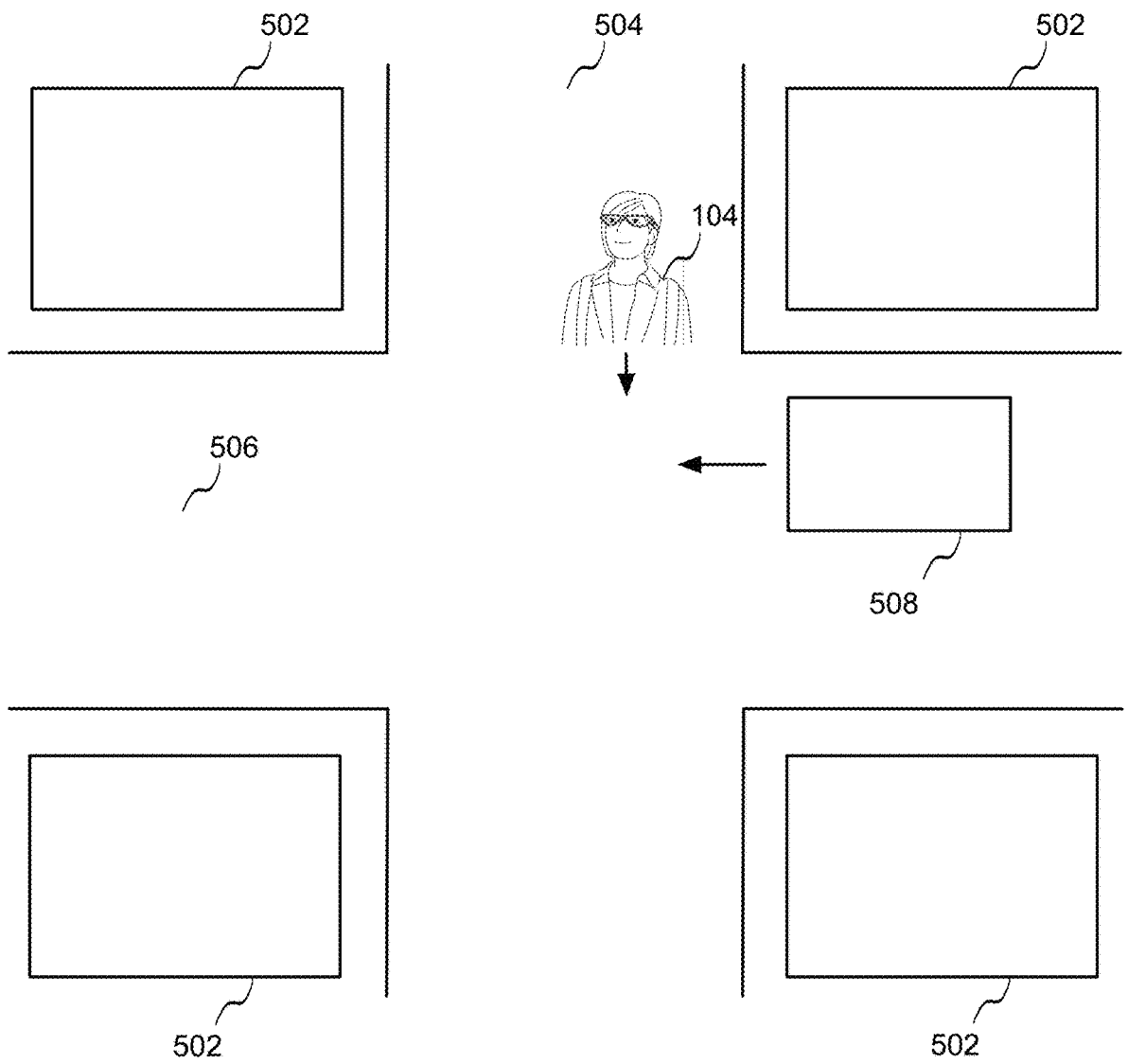
FIG. 5 illustrates a block diagram of an example augmented reality environment, according to some implementations.

FIG. 5 illustrates a block diagram of an example augmented reality environment 500, according to some implementations. Shown are buildings 502, a street 504 on which user 104 is walking, and a street 506 on which a car 508 is moving.

In some implementations, the system may determine navigation information based on user location information, user gaze information, etc. In some implementations, the navigation information may be used to direct user 104 where to go if user 104 is driving a car.

Various implementations described herein may also be used in a self-driving car navigation system. In some implementations, the system may collect information associated with the car, where such information is similar to user information collected for a user. For example, such information may include location information as described herein (e.g., GPS information, etc.). In various implementations, the system may aggregate information associated with other cars and user information associated with users. In some implementations, the AR system may receive information associated with multiple cars, including self-driving cars, where multiple devices in the different cars upload information to the AR system. The AR system may aggregate and synthesize the information from multiple car in order to include more data for various purposes. For example, such information may be used to monitor the surroundings (e.g., moving objects) in proximity to the self-driving car. The system may use such information to prevent accidents. For example, the system may cause the navigation system of the self-driving car to be ready to slow down, stop, or turn if another object crosses the path of the self-driving car. Such information may also be used to generate the 3D map described herein.

In some implementation, if user 104 is in the self-driving car and user 104 is wearing user device 202, the system may utilize information from both the information associated with the self-driving car and the user information associated with user 104. In various implementations, the location information for both the self-driving car and the user 104 match, as both are moving together. In some implementations, the user information associated with user 104 may include attention information. Such attention information might not affect the self-driving car directly but may affect relevant information provided to user 104. For example, the system may provide an advertisement to user 104. The system may enable user 104 to give commands to the self-driving car navigation system if user 104 wants to take action based on the advertisement. For example, user 104 may instruct the self-driving car to go to a particular restaurant in the advertisement.

Referring to FIG. 5, if user 104 is walking along street 504, and car 508 is moving on street 506, and both are moving toward the same intersection, user device 202 may display an alert to user 104 in order to direct user 104 to stop or to turn in order not to step into the path of car 508. Similarly, a user device associated with car 508 may direct car 508 to slow down or be ready to stop in case user 104 steps into the path of car 508.

For ease of illustration, FIG. 5 shows four buildings 502, one user 104, and one car 508. These objects may represent multiple objects of each type. In other implementations, augmented reality environment 500 may not have all of the objects shown and/or may have other objects including other types of objects instead of, or in addition to, those shown herein. For example, augmented reality environment 500 may include multiple cars moving in different directions. Augmented reality environment 500 may include multiple people walking or biking.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Embodiments described herein provide various benefits. In particular, embodiments provide a user with behavioral options such as where to go have a meal, make purchase, etc. Implementations may also provide safety and/or navigation choices for a user. These benefits may also be valuable in engaging and maintaining user involvement in any of a variety of activities associated with personal development, health, educational, gaming, and various commercial or business applications.

Figure 6:
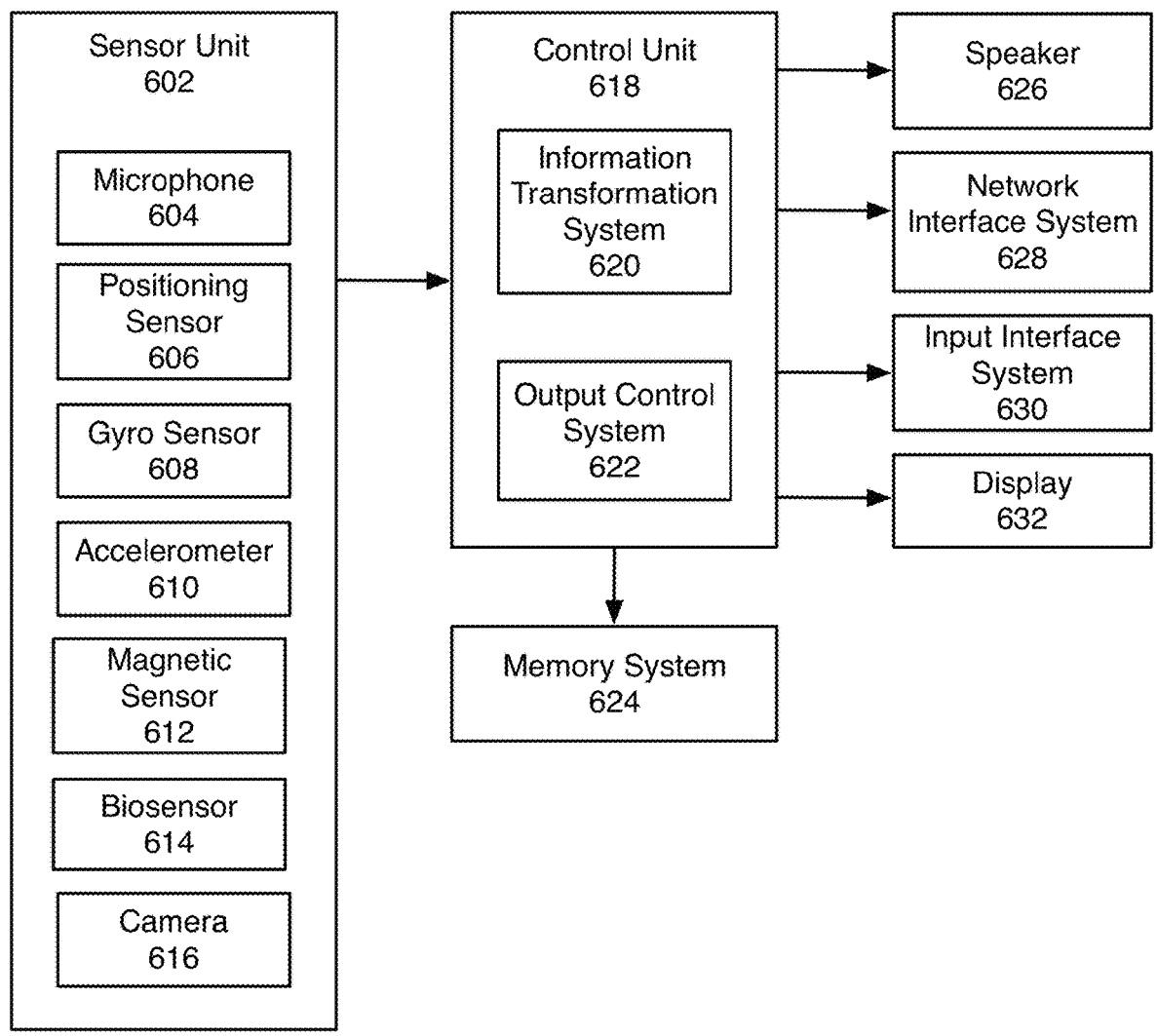
FIG. 6 illustrates a block diagram of an augmented reality system, according to some implementations.

FIG. 6 is a schematic block diagram of an agent system 600. System 600 includes sensor unit 602. In various implementations, agent system 600 may reside on and/or be integrated with a user device such as user device 202 of FIG. 2. In some implementations, sensor unit 602 may include a microphone 604, a positioning sensor 606, a gyro sensor 608, an accelerometer 610, a magnetic sensor 612, a biosensor 614, and a camera 616.

System 600 also includes a control unit 618. In various implementations, control unit 618 may include an information transformation system 620 and an output control system 622. System 600 also includes a memory system 624, a speaker 626, a network interface system 628, an input interface system 630, and a display 632. Some of these components may be optional. For example, system 600 may or may not include an integrated display, and system 600 may output information to a display 632 in some implementations.

For ease of illustration, FIG. 6 shows one block for each type of component shown. These blocks may represent multiple components of each type. For example, there may be multiple speakers. In various implementations, system 600 may not have all of the components shown and/or may have other elements including other types of components instead of, or in addition to, those shown herein.

In some implementations positioning sensor 606 may depend on a global positioning system (GPS), WiFi, Bluetooth, or other suitable technologies. As shown, control unit 618 is operably connected to sensor unit 602, memory system 624, speaker 626, network interface system 628, input interface system 630, and display 632. Control unit 618 also includes one or more processors (not shown) that operates in conjunction with instructions and data from memory system 624, network interface system 628, and/or input interface system 630 (simple hardware devices such as a power button, a brightness control knob, etc.) to transform information gathered from sensor unit 602 into data usable by output control system of unit 622. In some implementations, this data and other information procured by agent system 600 may be provided to the user via components such as speaker 626, and some data and/or information may be provided to remote systems via network interface system 628, according to the particular applications being run in conjunction with agent system 600.

Figure 7:
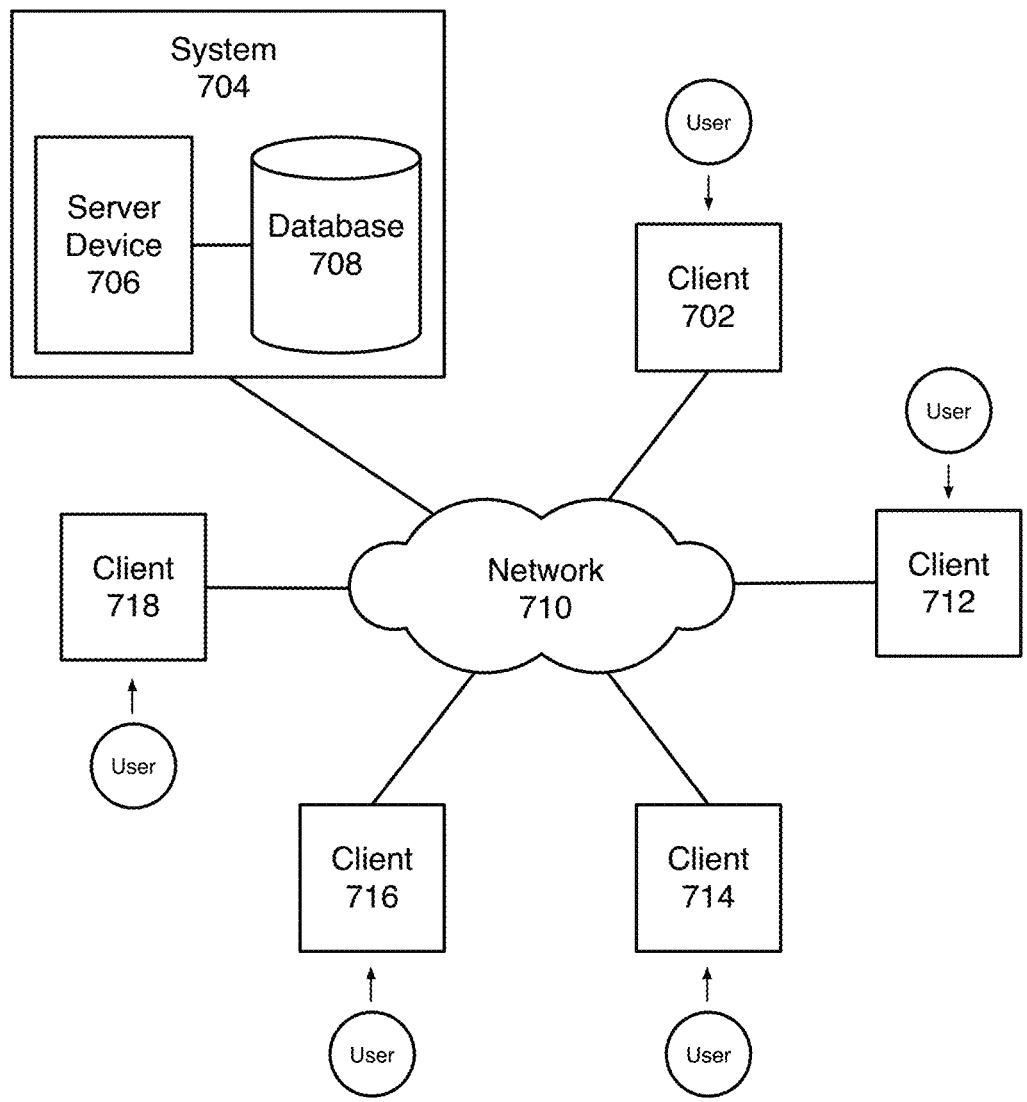
FIG. 7 illustrates a block diagram of an example network environment, which may be used for some implementations described herein.

FIG. 7 illustrates a block diagram of an example network environment 700, which may be used for some implementations described herein. Implementations described herein may be implemented by a client 702 such as user device 202 of FIG. 2, or may be implemented by client 702 in combination with a system 704 (e.g., an AR system). In some implementations, client 702 communicates with system 704. System 704 may include a server device 706 and a database 708. Also shown is a network 710 through which system 704 and/or client 702 may communicate with clients 712, 714, 716, and 718 (e.g., other user devices).

For ease of illustration, FIG. 7 shows one block for each various components of network environment 700. These blocks may represent components of each type of component. In other implementations, network environment 700 may not have all of the components shown and/or may have other elements including other types of elements instead of, or in addition to, those shown herein.

In the various implementations described herein, client 702 causes the elements described herein (e.g., advertisements, alerts, navigation information, and other relevant information) to be provided to the user (e.g., displayed in a user interface on one or more display screens, etc.).

Figure 8:
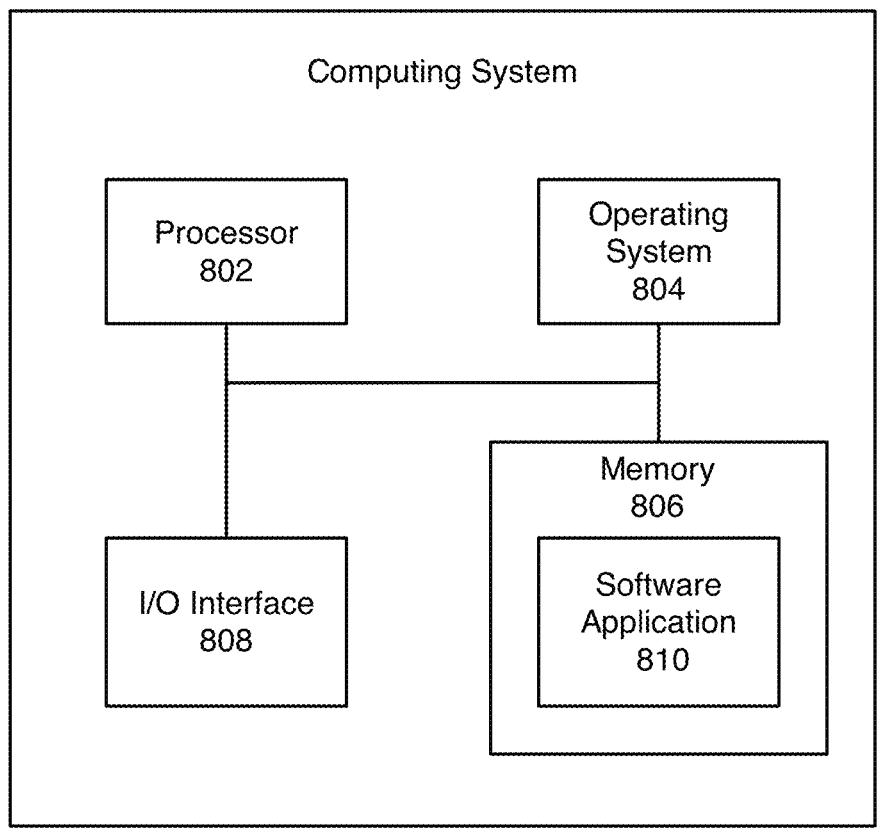
FIG. 8 illustrates a block diagram of an example computing system, which may be used for some implementations described herein.

FIG. 8 illustrates a block diagram of an example computing system 800, which may be used for some implementations described herein. For example, computing system 800 may be used to implement user device 202 of FIG. 2, as well as to perform implementations described herein. In some implementations, computing system 800 may include a processor 802, an operating system 804, a memory 806, and an input/output (I/O) interface 808. In various implementations, processor 802 may be used to implement various functions and features described herein, as well as to perform the method implementations described herein. While processor 802 is described as performing implementations described herein, any suitable component or combination of components of computing system 800 or any suitable processor or processors associated with computing system 800 or any suitable system may perform the steps described. Implementations described herein may be carried out on a user device, on a server, or a combination of both.

Computing system 800 also includes a software application 810, which may be stored on memory 806 or on any other suitable storage location or computer-readable medium. Software application 810 provides instructions that enable processor 802 to perform the implementations described herein and other functions. Software application may also include an engine such as a network engine for performing various functions associated with one or more networks and network communications. The components of computing system 800 may be implemented by one or more processors or any combination of hardware devices, as well as any combination of hardware, software, firmware, etc.

For ease of illustration, FIG. 8 shows one block for each of processor 802, operating system 804, memory 806, I/O interface 808, and software application 810. These blocks 802, 804, 806, 808, and 810 may represent multiple processors, operating systems, memories, I/O interfaces, and software applications. In various implementations, computing system 800 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method comprising:
   determining, using a client device, user information associated with a user, wherein the user information also includes a current user activity and movement of surrounding objects;
   generating a three-dimensional (3D) map of a physical environment based on the user information;
   determining relevant information based on the user information;
   displaying the relevant information in the 3D map in a user interface of the client device; and
   providing an alert based on the movement of surrounding objects, wherein the relevant information, the alert, and a view of the physical environment are displayed simultaneously in the user interface of the client device, wherein the relevant information and the alert are superimposed on the view of the physical environment, wherein the movement of surrounding objects comprises movement of a car, wherein the alert comprises navigation information, and wherein the navigation information comprises one of a direction to stop and a direction to turn in order to prevent the user from stepping into a path of the car.

2. The method of claim 1, wherein the user information includes 3D depth data, wherein the 3D depth data is collected by the client device.

3. The method of claim 1, wherein the user information also includes user attention information.

4. The method of claim 1, wherein the user information also includes user activity information.

5. The method of claim 1, wherein the alert comprises navigation information.

6. The method of claim 1, wherein the relevant information comprises advertisements, and wherein at least one of the advertisements is displayed against a building in the physical environment in the user interface of the client device.

7. A non-transitory computer-readable storage medium carrying program instructions thereon, the instructions when executed by one or more processors cause the one or more processors to perform operations comprising:

determining, using a client device, user information associated with a user, wherein the user information also includes a current user activity and movement of surrounding objects;

generating a three-dimensional (3D) map of a physical environment based on the user information;

determining relevant information based on the user information;

displaying the relevant information in the 3D map in a user interface of the client device; and providing an alert based on the movement of surrounding objects, wherein the relevant information, the alert, and a view of the physical environment are displayed simultaneously in the user interface of the client device, wherein the relevant information and the alert are superimposed on the view of the physical environment, wherein the movement of surrounding objects comprises movement of a car, wherein the alert comprises navigation information, and wherein the navigation information comprises one of a direction to stop and a direction to turn in order to prevent the user from stepping into a path of the car.

8. The computer-readable storage medium of claim 7, wherein the user information includes 3D depth data, wherein the 3D depth data is collected by the client device.

9. The computer-readable storage medium of claim 7, wherein the user information also includes user attention information.

10. The computer-readable storage medium of claim 7, wherein the user information also includes user activity information.

11. The computer-readable storage medium of claim 7, wherein the determining of the relevant information is further based on one or more relevance policies.

12. The computer-readable storage medium of claim 7, wherein the relevant information comprises advertisements.

13. A system comprising:

one or more processors; and logic encoded in one or more non-transitory computer-readable storage media for execution by the one or more processors and when executed operable to perform operations comprising:

determining, using a client device, user information associated with a user, wherein the user information also includes a current user activity and movement of surrounding objects;

generating a three-dimensional (3D) map of a physical environment based on the user information;

determining relevant information based on the user information;

displaying the relevant information in the 3D map in a user interface of the client device; and providing an alert based on the movement of surrounding objects, wherein the relevant information, the alert, and a view of the physical environment are displayed simultaneously in the user interface of the client device, wherein the relevant information and the alert are superimposed on the view of the physical environment, wherein the movement of surrounding objects comprises movement of a car, wherein the alert comprises navigation information, and wherein the navigation information comprises one of a direction to stop and a direction to turn in order to prevent the user from stepping into a path of the car.

14. The system of claim 13, wherein the user information includes 3D depth data, wherein the 3D depth data is collected by the client device.

15. The system of claim 13, wherein the user information also includes user attention information.

16. The system of claim 13, wherein the user information also includes user activity information.

17. The system of claim 13, wherein the determining of the relevant information is further based on one or more relevance policies.

* * * * *